(12) United States Patent
Iio et al.

(10) Patent No.: US 11,808,699 B2
(45) Date of Patent: Nov. 7, 2023

(54) IMAGING SYSTEM (71) Applicant: CANON KABUSHIKI KAISHA, Tokyo (JP)

(72) Inventors: Akihisa Iio, Kanagawa (JP); Takahiro Sato, Kanagawa (JP); Takeaki Itsuji, Kanagawa (JP); Yasushi Koyama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/320,611

(22) Filed: May 14, 2021

(65) Prior Publication Data
US 2021/0364425 A1 Nov. 25, 2021

(30) Foreign Application Priority Data

May 19, 2020 (JP) .................................. 2020-087431

(51) Int. Cl.
G01N 21/35 (2014.01)
G01N 21/3581 (2014.01)
H04N 5/33 (2023.01)

(52) U.S. Cl.
CPC ........... *G01N 21/3581* (2013.01); *H04N 5/33* (2013.01); *G01N 2201/06113* (2013.01)

(58) Field of Classification Search
CPC ..... G01N 21/3581; G01N 2201/06113; H04N 5/33
See application file for complete search history.

(56) References Cited

U.S. PATENT DOCUMENTS

| 7,205,926 | B2 | 4/2007 | Rowe et al. |
| 7,531,804 | B2 | 5/2009 | Itsuji |
| 7,551,269 | B2 | 6/2009 | Itsuji |
| 7,737,402 | B2 | 6/2010 | Koyama |
| 7,763,868 | B2 | 7/2010 | Ouchi et al. |
| 7,852,466 | B2 | 12/2010 | Itsuji |
| 10,879,281 | B2 | 12/2020 | Itsuji et al. |
| 2005/0232459 | A1 | 10/2005 | Rowe et al. |
| 2008/0043102 | A1 | 2/2008 | Rowe et al. |
| 2008/0296501 | A1* | 12/2008 | Breit .......................... G01J 3/42 250/336.1 |
| 2009/0140907 | A1* | 6/2009 | Keller ................. G01N 21/3563 342/179 |
| 2010/0027378 | A1* | 2/2010 | Sabatier ............. G08B 13/1627 367/136 |
| 2011/0080315 | A1 | 4/2011 | Reilly et al. |

(Continued)

FOREIGN PATENT DOCUMENTS

| JP | 2007-536506 A | 12/2007 |
| JP | 2018-87725 A | 6/2018 |
| JP | 2018-156586 A | 10/2018 |

*Primary Examiner* — Hugh Maupin
(74) *Attorney, Agent, or Firm* — VENABLE LLP (57) ABSTRACT An imaging system comprising: a first lighting device that emits terahertz waves at a first quantity of light emission in a first operation mode, and emits terahertz waves at a second quantity of light emission, which is larger than the first quantity of light emission, in a second operation mode; a first detection device that detects reflected terahertz waves by a target and a control device that switches from the first operation mode to the second operation mode in a case where the first detection device detects the target in the first operation mode.

20 Claims, 7 Drawing Sheets

(56) References Cited

U.S. PATENT DOCUMENTS

| | | | |
|---|---|---|---|
| 2016/0205917 A1* | 7/2016 | Chan | A01M 21/046 |
| 2019/0020811 A1* | 1/2019 | Tzuang | H04N 5/2256 |
| 2019/0259791 A1 | 8/2019 | Itsuji et al. | |
| 2021/0098513 A1 | 4/2021 | Itsuji et al. | |

* cited by examiner

IMAGING SYSTEM

BACKGROUND OF THE INVENTION

Field of the Invention

The present invention relates to an imaging system that performs imaging by emitting terahertz waves.

Description of the Related Art

Terahertz waves are electromagnetic waves typically having a component in any frequency band within a range of 0.2 THz to 30 THz. This frequency band includes many characteristic absorptions derived from structures and states of various substances, such as biomolecules and resins. In addition, since terahertz waves have a longer wavelength than visible light and infrared light, terahertz waves are less likely to be affected by scattering and therefore exhibit a property of strong transmission through many substances. Moreover, terahertz waves have a shorter wavelength than millimeter waves and therefore exhibit high spatial resolution (directivity).

Hence, terahertz waves exhibit both "light directivity" and "radio wave transmission", and it is therefore expected that terahertz waves are applied to imaging applications in public places such as body checks and surveillance cameras.

Japanese Patent Application Publication No. 2018-087725 discloses an active camera system (an imaging system) that acquires terahertz wave images by emitting terahertz waves.

Here, a lighting device that emits terahertz waves requires a higher power consumption than an emission device that emits visible light and infrared light. Therefore, when an imaging system having a lighting device that emits terahertz waves is used in a surveillance camera or the like, a problem arises in that the device has to be operated for a long time in order to continuously photograph a subject, meaning that the power consumption required of the imaging system is large.

SUMMARY OF THE INVENTION

Hence, an object is to provide a technique with which it is possible to reduce power consumption when photographing a subject by emitting terahertz waves.

An aspect of a disclosure of the present technique is: an imaging system comprising: a first lighting device that emits terahertz waves at a first quantity of light emission in a first operation mode, and emits terahertz waves at a second quantity of light emission, which is larger than the first quantity of light emission, in a second operation mode; a first detection device that detects reflected terahertz waves by a target; and a control device that switches from the first operation mode to the second operation mode in a case where the first detection device detects the target in the first operation mode.

An aspect of a disclosure of the present technique is: an imaging system comprising: a first lighting device that emits terahertz waves at a first power consumption in a first operation mode, and emits terahertz waves at a second power consumption, which is larger than the first power consumption, in a second operation mode; a first detection device that detects a target reflected terahertz waves by the target; and a control device that switches from the first operation mode to the second operation mode in a case where the first detection device detects the target in the first operation mode.

An aspect of a disclosure of the present technique is: an imaging system comprising: a first lighting device configured to emit terahertz waves in a first operation mode and a second operation mode, wherein a second light emitting quantity of the second operation mode is larger than a first light emitting quantity of the first operation mode; a first detection device configured to detect reflected terahertz waves; and a control device that switches from the first operation mode to the second operation mode in a case where the first detection device detects a first reflected terahertz waves reflected by a subject in the first operation mode.

Further features of the present invention will become apparent from the following description of exemplary embodiments with reference to the attached drawings.

DESCRIPTION OF THE EMBODIMENTS

Embodiments will be described in detail below with reference to the attached figures. Note that the invention according to the claims is not limited by the following embodiments. A plurality of features are described in the embodiments, but not all of the plurality of features are essential to the invention, and moreover, the plurality of features may be combined as desired. Furthermore, identical reference numerals have been allocated in the attached figures, and duplicate description has been omitted.

Figure 1:
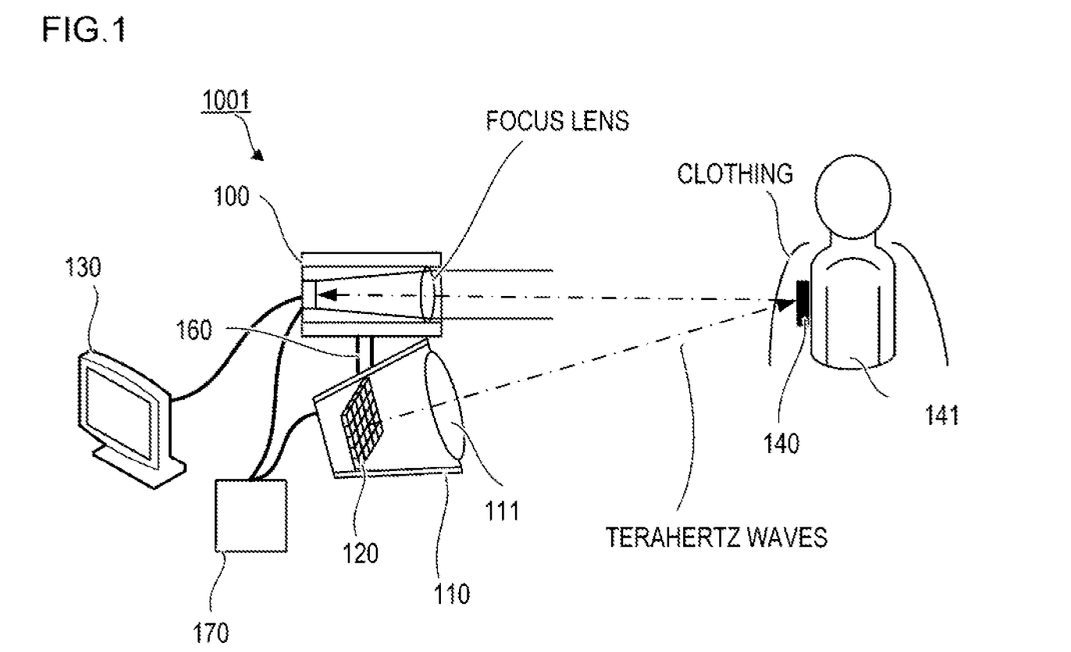
FIG. 1 is a view showing a configuration of an imaging system according to a first embodiment.

First Embodiment (Configuration of Imaging System): Referring to FIG. 1, a configuration of an imaging system 1001 (a camera system; an imaging device) according to this embodiment, which performs imaging by emitting terahertz waves, will be described. FIG. 1 is a pattern diagram illustrating the configuration of the imaging system 1001. Here, the frequency of the terahertz waves (electromagnetic waves) emitted by the imaging system 1001 preferably either includes a component of a desired frequency band within a range from at least 0.2 THz to not more than 30 THz, within which the frequency is not assigned, or is a single wavelength within the range. Since many types of clothing have high transparency up to 1 THz, when the terahertz waves are used in inspections to search for concealed objects or the like, as in this embodiment, a frequency range from at least 0.2 THz to not more than 1 THz is even more preferable.

The imaging system 1001 includes a first detection unit 100, a first lighting unit 110, a monitoring unit 130, a support member 160, and a control unit 170.

The first detection unit 100 (a first detection device) detects a subject by detecting reflected waves (reflected light) generated when terahertz waves emitted by the first lighting unit 110 are reflected by the subject. Here, the subject is also referred to as a target, and the target may be any person or any object to be photographed by the imaging system 1001. After detecting reflected waves from the subject, the first detection unit 100 generates a signal (an image signal (image information), for example) including information about the subject on the basis of the reflected waves. Note that since the first detection unit 100 is capable of photographing a subject on the basis of reflected waves, in this embodiment, the first detection unit 100 may also be referred to as an imaging unit (an imaging device). Further, in this embodiment, the imaging system 1001 includes one first detection unit 100, but the number of first detection units 100 provided in the imaging system 1001 is not limited to one, and at least two thereof may be provided.

The first lighting unit 110 (a first lighting device) is a lighting device for irradiating the subject with terahertz waves. Note that in this embodiment, the first lighting unit 110 emits terahertz waves onto a first subject 140, which is a concealed object carried by a person, and a second subject 141, which is the person (a human body). Here, the first subject 140 is carried inside the clothing of the second subject 141 and is therefore invisible to the human eye from the outside. Furthermore, in this embodiment, the imaging system 1001 includes one first lighting unit 110, but the number of first lighting units 110 provided in the imaging system 1001 is not limited to one, and at least two thereof may be provided. Note that although the second subject 141 will be described below as a person (a human body), the second subject 141 may be any object, such as an animal or a vehicle.

Here, the first lighting unit 110 includes a plurality of lighting elements 120 that emit terahertz waves, and a lighting optical system 111. In this embodiment, the number of lighting elements 120 included in the first lighting unit 110 is 25 (a 5×5 array).

The lighting optical system 111 is an optical element having an image-forming function. The lighting optical system 111 may be either a transmissive lighting optical system such as a lens, or a reflective lighting optical system such as a mirror. When the lighting optical system 111 is a transmissive system such as a lens, a material that exhibits little loss with respect to the used terahertz waves is preferably used as the lighting optical system 111. For example, Teflon (registered trademark) or High Density Polyethylene can be used as the material of the lighting optical system 111.

The plurality of lighting elements 120 may be arranged on the same plane or arranged so as to form a curve. The terahertz waves emitted respectively by the plurality of lighting elements 120 are converged by the lighting optical system 111. When the lighting optical system 111 is transmissive, the first lighting unit 110 and the lighting optical system 111 are arranged coaxially. Hence, when the lighting optical system 111 is transmissive, alignment (arrangement) is easy, and as a result, a small installation space is sufficient for the lighting optical system 111, enabling a reduction in the size thereof. When the lighting optical system 111 is a reflective system such as a mirror, on the other hand, the size thereof can be increased more easily than with a transmissive system. Accordingly, the surface area on which light can be received from the first lighting unit 110 can be increased easily, making it easy to increase the quantity of light converged by the lighting optical system 111.

The monitoring unit 130 acquires the signal of the terahertz waves detected by the first detection unit 100 and displays an image of the subject based on the signal. The support member 160 connects the first detection unit 100 to the first lighting unit 110.

The control unit 170 controls the first detection unit 100 and the first lighting unit 110. The control unit 170 may be a computer (a control device) including a CPU and a storage unit for storing a control program, for example. Note that the control unit 170 (the CPU) controls the first detection unit 100 and the first lighting unit 110 by executing the stored control program.

Note that a semiconductor element that is comparatively easy to handle and can be used in a small-scale system may be used as the first lighting unit 110 (a terahertz wave source) and the first detection unit 100 (a terahertz wave detection element). A Quantum Cascade Laser (QCL), a Resonant Tunneling Diode (RTD), and so on, for example, may be cited as terahertz wave sources using a semiconductor element. A MEMS (Micro Electro Mechanical Systems) type heat detector (a bolometer), a Schottky Barrier Diode (SBD), and so on may be cited as detectors using a semiconductor element.

Figure 2:
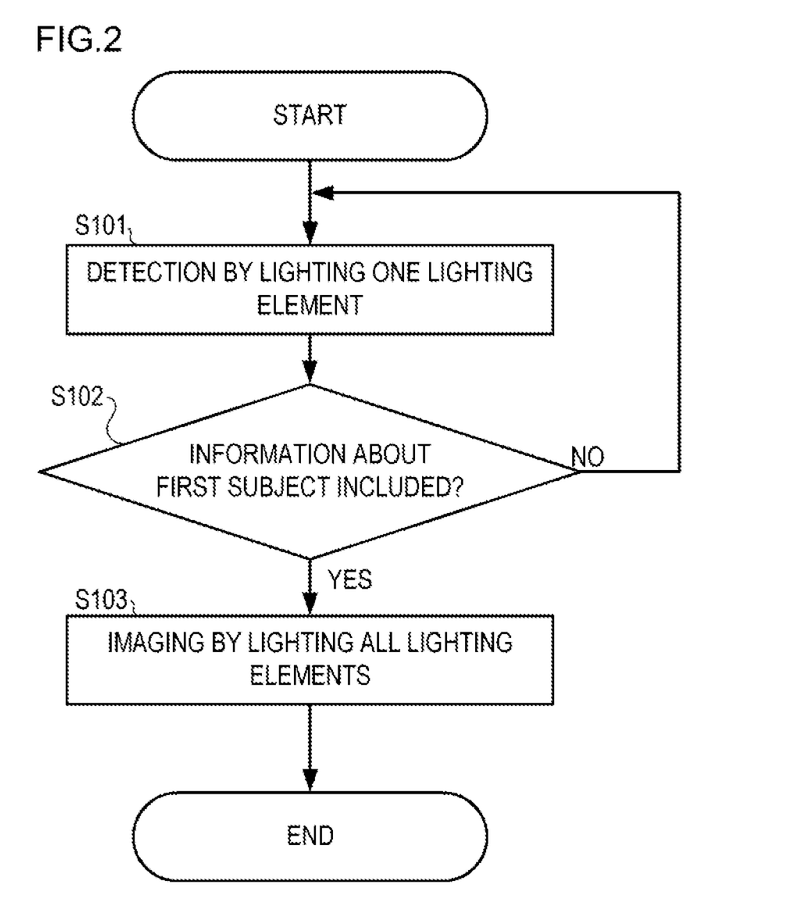
FIG. 2 is a flowchart of an operation of the imaging system according to the first embodiment.
Figure 3:
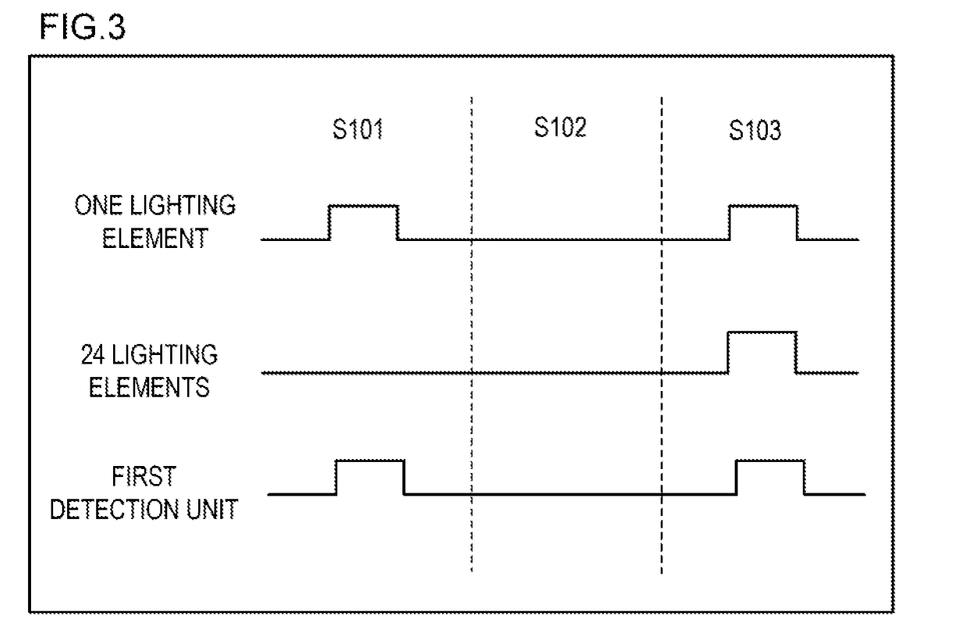
FIG. 3 is a time chart of the operation of the imaging system according to the first embodiment.

(Operation of Imaging System): Referring to FIGS. 2 and 3, an operation (a control method) of the imaging system 1001 will be described. FIG. 2 is a flowchart of the operation of the imaging system 1001. FIG. 3 is a time chart showing the occurrence of operations by the respective configurations of the imaging system 1001. Note that the processing of the flowchart shown in FIG. 2 can be realized by the control unit 170 by executing a program stored in a storage unit (a storage medium) or the like. Here, the lighting elements 120 include lighting elements 121 having a low directivity and lighting elements 122 having a higher directivity than the lighting elements 121.

(Step S101): In S101, as a first operation mode, the imaging system 1001 detects light (reflected waves) generated when terahertz waves emitted by the low-directivity lighting elements 121 are reflected by the subject. More specifically, the control unit 170 either lights or intermittently lights (lights by means of repeated lighting and extinguishing within one frame period) a single lighting element 120 among the low-directivity lighting elements 121 by controlling the first lighting unit 110 using a control signal. Further, by controlling the first detection unit 100 using a control signal, the control unit 170 detects the light (reflected waves) generated when the terahertz waves emitted by the first lighting unit 110 are reflected by the subject, and generates (acquires) a signal based on the reflected waves.

Note that in S101, as shown on the time chart in FIG. 3, while the single lighting element 120 is lit, the remaining 24 lighting elements 120 are extinguished. Thus, in S101, the number of lit lighting elements 120 can be suppressed, and as a result, the power consumption of the first lighting unit 110 can be reduced.

Further, by detecting the reflected waves of the terahertz waves that are emitted when a small number of low-directivity lighting elements 120 are lit, effects are achieved in that detection can be performed more easily over a wide range, and the subject can be detected at high speed. As a result, the lighting time of the lighting elements 120 can be shortened.

(Step S102): In S102, the control unit 170 controls the first detection unit 100 to determine whether or not the first subject 140 (the concealed object) has been detected. More specifically, the control unit 170 (the first detection unit 100) determines whether or not the signal based on the reflected waves detected by the first detection unit 100 includes information about the first subject 140. When information about the first subject 140 is included, the processing advances to S103, and when the information is not included, the processing returns to S101. In a case where the processing advances to S103, the terahertz waves emitted by the first lighting unit 110 have been reflected by the first subject 140 and have entered the first detection unit 100. At this time, specularly reflected waves of the terahertz waves reflected by the first subject 140 enter the first detection unit 100. Accordingly, the control unit 170 controls the first detection unit 100 and the first lighting unit 110 so as to ensure that the specularly reflected waves of the terahertz waves reflected by the first subject 140 enter the first detection unit 100. For example, the control unit 170 modifies (changes) the position of the first lighting unit 110 so as to modify the emission direction of the terahertz waves from the first lighting unit 110. Alternatively, the control unit 170 may use beamforming to improve the directivity of the first detection unit 100 and the first lighting unit 110 relative to the direction in which the first subject 140 exists. At least one among the first detection unit 100 and the first lighting unit 110 may include a drive member for modifying the position and orientation thereof.

Note that in S102, as shown on the time chart in FIG. 3, the 25 lighting elements 120 are all in an extinguished state. However, the single lighting element 120 lit in S101 may continue to be lit in S102. In other words, the lighting unit 110 may light the lighting elements 120 in the first operation mode likewise in S102. Moreover, in S102, the first detection unit 100 does not detect reflected waves (the subject).

Furthermore, with regard to the determination made in S102 as to whether or not the signal based on the reflected waves includes information about the first subject 140, the determination may be made in accordance with shapes that can be estimated as dangerous objects from the contours thereof using a machine learning model rather than simply using the signal strength and data acquired in advance as a reference. Further, AI (Artificial Intelligence) may be used in the determination. For example, an identifier (a trained model) that has passed through deep learning may be incorporated into the first detection unit 100 (or the control unit 170), and the determination may be made by extracting feature information using AI. More specifically, the first detection unit 100 includes a trained model that has been trained by machine learning such as deep learning, and by inputting the acquired signal (information) into the trained model, the first detection unit 100 determines from the trained model whether or not the signal (information) includes information about the first subject 140. Note that the trained model can be generated as follows. First, a plurality of combinations of image information about dangerous objects (concealed objects) and information identifying dangerous objects are input into a learning model as training data used for learning. Then, on the basis of a desired, well-known supervised machine learning algorithm, a trained model is generated from the training data. The trained model may be generated on the basis of a hierarchical neural network or another machine learning algorithm, such as SVM, instead of deep learning (a multilayer neural network).

(Step S103): In S103, as a second operation mode, the imaging system 1001 photographs the first subject 140 (acquires image information about the first subject 140) using light generated by the terahertz waves emitted by all of the lighting elements 120. More specifically, the control unit 170 lights all (25) of the lighting elements 120 of the first lighting unit 110 by controlling the first lighting unit 110 using a control signal. The control unit 170 then performs imaging processing by controlling the first detection unit 100 to detect the reflected waves generated when the terahertz waves emitted by the first lighting unit 110 are reflected by the first subject 140. At this time, a focusing operation may be performed by focus lens control using a typical camera autofocus system or the like. In other words, in S103, the control unit 170 switches from the first operation mode, in which the lighting unit 110 is lit darkly, to the second operation mode, in which the lighting unit 110 is lit brightly. Note that the light quantity of the light emitted onto the subject (the quantity of light emission by the first lighting unit 110; the emission quantity) is larger in S103 than in S101.

As regards the number of lit lighting elements 120, as long as the number of lighting elements 120 lit in S101 is smaller than the number of lighting elements 120 lit in S103, the numbers of lighting elements 120 lit in the respective steps may be set as desired. For example, one lighting element 120 may be lit in S101, and the 24 lighting elements 120 other than that lighting element may be lit in S103. In other words, the lighting elements 120 lit in S101 and the lighting elements 120 lit in S103 may be different lighting elements 120. By lighting the lighting elements 120 in this manner, a situation in which the lighting elements 120 lit in S101 come to the end of their lives as lighting elements much earlier than the lighting elements 120 lit in S103 can be suppressed.

Figure 4A:
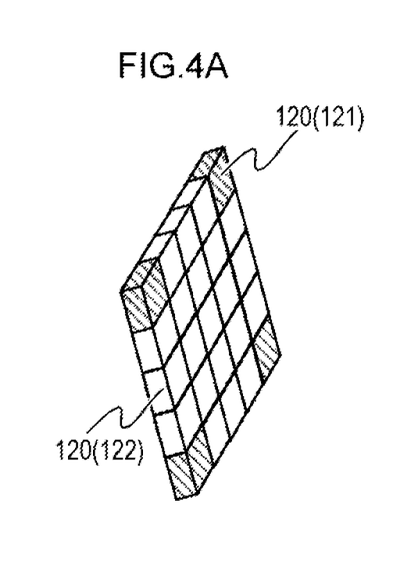
FIGS. 4A to 4C are views showing arrangements of lighting elements according to the first embodiment.
Figure 4B:
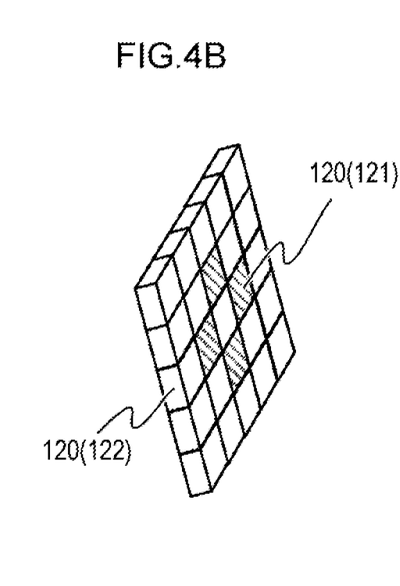
Figure 4C:
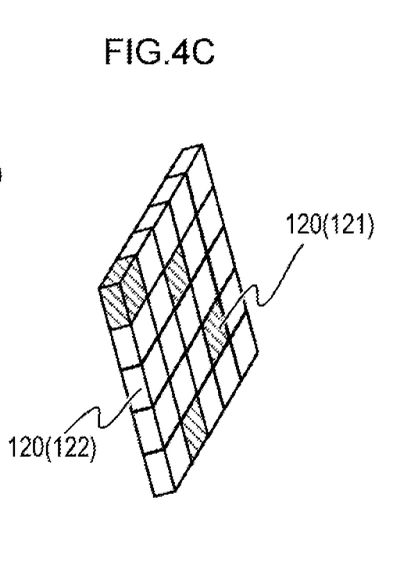

Further, the positions of the lighting elements 120 (the lighting elements 121) lit in S101 (the first operation mode), among the 25 lighting elements, may be set as desired. FIGS. 4A to 4C show examples of cases in which four lighting elements 120 are lit in S101. In FIGS. 4A to 4C, the lighting elements 120 lit in S101 are indicated by shading. In S101, the four lighting elements 120 in the four corners, among the 25 lighting elements 120, may be lit, as shown in FIG. 4A, or the tour lighting elements 120 in the center may be lit, as shown in FIG. 4B. Alternatively, lighting elements 120 in irregular positions, among the 25 lighting elements 120, may be lit, as shown in FIG. 4C.

In this embodiment, as described above, first, the imaging system 1001 determines whether or not information about the first subject 140 is included in the result of detecting the subject by lighting a small number of the lighting elements 120. When information about the first subject 140 is included, the imaging system 1001 photographs the first subject 140 by lighting a larger number of the lighting elements 120. In other words, when the first subject 140 is not included in the result of detecting the subject by lighting a small number of the lighting elements 120, a larger number of the lighting elements 120 are not lit. As a result, the power consumption of the lighting elements 120 can be reduced even during a continuous operation performed when the terahertz imaging system is used in a surveillance camera or the like.

Further, in this embodiment, the directivity of the lit lighting elements 120 is varied between S101 (the first operation mode) and S103 (the second operation mode). When the lighting elements 120 having the low (wide) directivity are used, as in S101, detection of the subject can be performed over a wide range, and as a result, high-speed detection of the subject can be realized. When, on the other hand, the lighting elements 120 having the high (narrow)

directivity are used, as in S103, the quantity of emitted light per area of the terahertz waves can be increased, and moreover, the terahertz waves can be emitted from directly in front of the subject, and as a result, the quantity of reflected light from the terahertz waves per quantity of emitted light is increased. Hence, in S103, the first subject 140 can be photographed (detected) with low noise (a high SN ratio). In other words, according to this embodiment, high-speed detection can be realized over a wide range until the first subject 140 is detected, and after the first subject 140 is detected, high-precision imaging of the first subject 140 can be performed.

Furthermore, in the example described in this embodiment, high-directivity lighting elements and low-directivity lighting elements are used, but lighting elements of the same directivity may be used instead. More specifically, as long as the first lighting unit 110 is lit at a larger quantity of light emission (a larger power consumption; more brightly) in S103 (the second operation mode) than in S101 (the first operation mode), either method may be used. For example, in S101, the plurality of lighting elements 120 of the first lighting unit 110 may be lit one by one (in rotation) in accordance with the passage of time. By lighting the lighting elements 120 successively, a situation in which one lighting element 120 becomes worn prematurely can be suppressed, and as a result, the imaging system 1001 as a whole can be used for a longer time. Note that instead of lighting the lighting elements 120 one by one, a plurality of lighting elements 120 (two or three, for example) may be lit at a time. The positions thereof can be determined as desired. Furthermore, the number of lit lighting elements 120 in the first lighting unit 110, as well as the brightness (power consumption), drive frequency, duty ratio, and so on thereof, may be modified between S101 and S103.

Note that in the above description, the number of lit lighting elements 120 is modified between S101 (the first operation mode) and S103 (the second operation mode), but instead, the same number of lighting elements 120 may be lit. More specifically, in S101, all of the 25 lighting elements 120 may each be lit at a predetermined quantity of light emission, while in S103, all of the 25 lighting elements 120 may each be lit at a larger quantity of light emission than the predetermined quantity of light emission. Alternatively, lighting elements 120 having adjustable directivity height (width) may be used so that in S101, the 25 lighting elements 120 are all lit at a low directivity, while in S103, the 25 lighting elements 120 are all lit at a higher directivity than in S101.

Furthermore, following completion of the processing of S103, the control unit 170 may execute the processing of S103 again when image information about the first subject 140 has been acquired in S103, and execute the processing of S101 when image information has not been acquired. In other words, when the first subject 140 is detected (photographed) in S103, the control unit 170 continues to photograph the first subject 140 (continues the second operation mode) by emitting terahertz waves from the high-directivity lighting elements 121. When the first subject 140 is not detected (photographed) in S103, the control unit 170 may switch to detecting the subject using the light of the terahertz waves emitted by the low-directivity lighting elements 121 (i.e., switch to the first operation mode).

Second Embodiment

The object of this embodiment is to reduce the power consumption of the lighting elements 120 below that of the first embodiment. In this embodiment, the power consumption is further reduced by determining whether or not it is necessary to perform terahertz wave emission using the lighting elements 120 by means of visible light emission or infrared light emission. Note that visible light is light that can be sensed by the naked human eye and has a wavelength of at least 380 nm and less than 770 nm, for example. Infrared light is light (electromagnetic waves) with a wavelength of at least 770 nm and less than 1 mm, for example.

Figure 5:
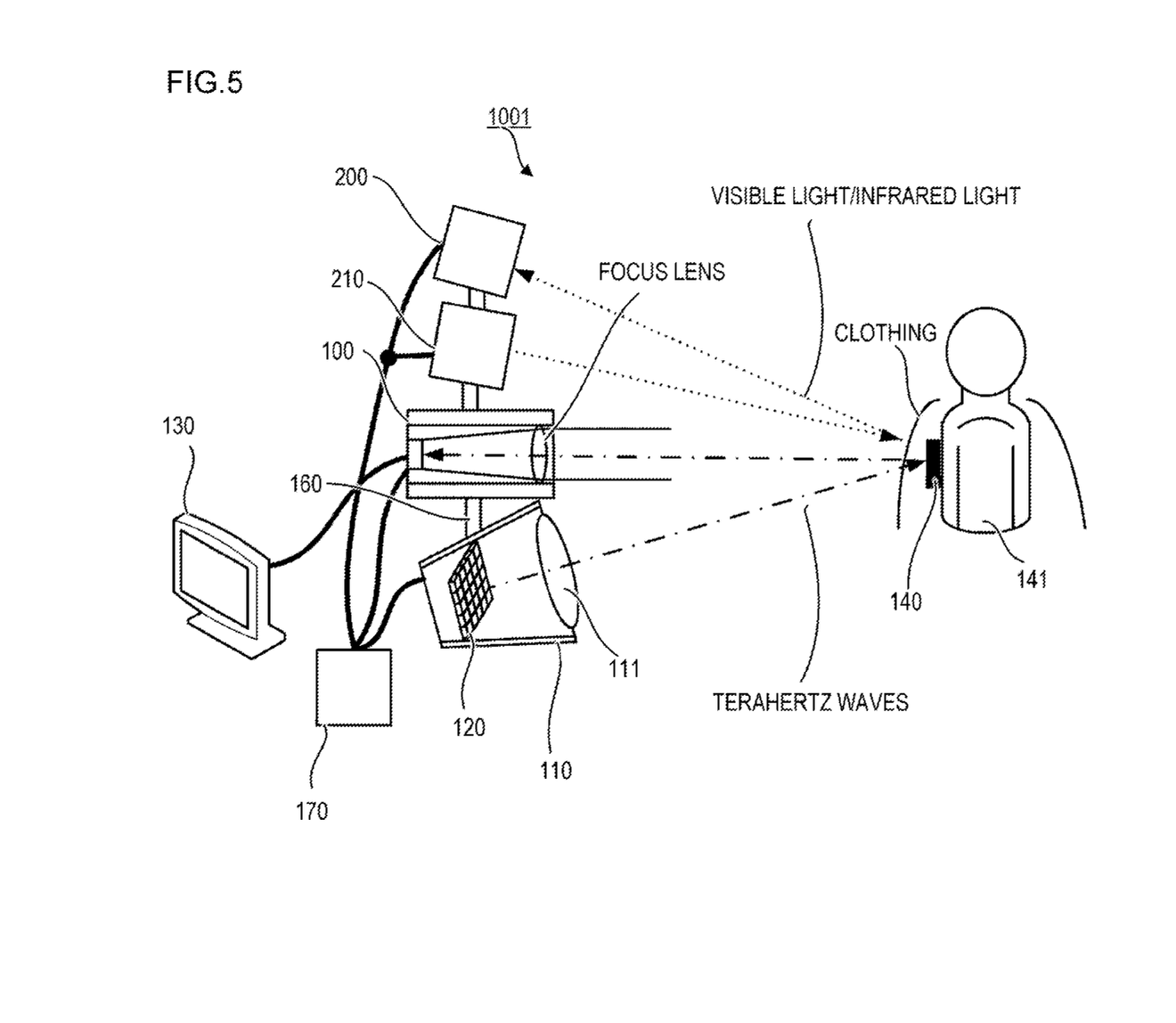
FIG. 5 is a view showing a configuration of an imaging system according to a second embodiment.

The imaging system 1001 according to this embodiment, as shown by the configuration diagram in FIG. 5, includes a second detection unit 200 and a second lighting unit 210. Note that the other configurations of the imaging system 1001 according to this embodiment are similar to those of the imaging system 100I according to the first embodiment. Accordingly, configurations shared by the two embodiments have been allocated identical reference numerals in FIG. 5, and detailed description thereof has been omitted.

The second detection unit 200 (a second detection device) is a human sensor, for example. The second detection unit 200 is sensitive to visible light or infrared light, and detects the subject by detecting visible light or infrared light. Note that in this embodiment, the first detection unit 100 and the second detection unit 200 are capable of detecting subjects within the same range. Note that since visible light or infrared light has a weaker transmission property than terahertz waves, in the example shown in FIG. 5, the second detection unit 200 is capable of detecting the second subject 141, which is a person, or clothing, but is not capable of detecting the first subject 140, which is a concealed object covered by clothing.

The second lighting unit 210 (a second lighting device) emits visible light or infrared light onto the subject. Here, a smaller quantity of power is required to realize emission (lighting) by visible light or infrared light than by terahertz waves. In other words, light emission by the second lighting unit 210 can be realized using a smaller quantity of consumed power than light emission by the first lighting unit 110.

Figure 6:
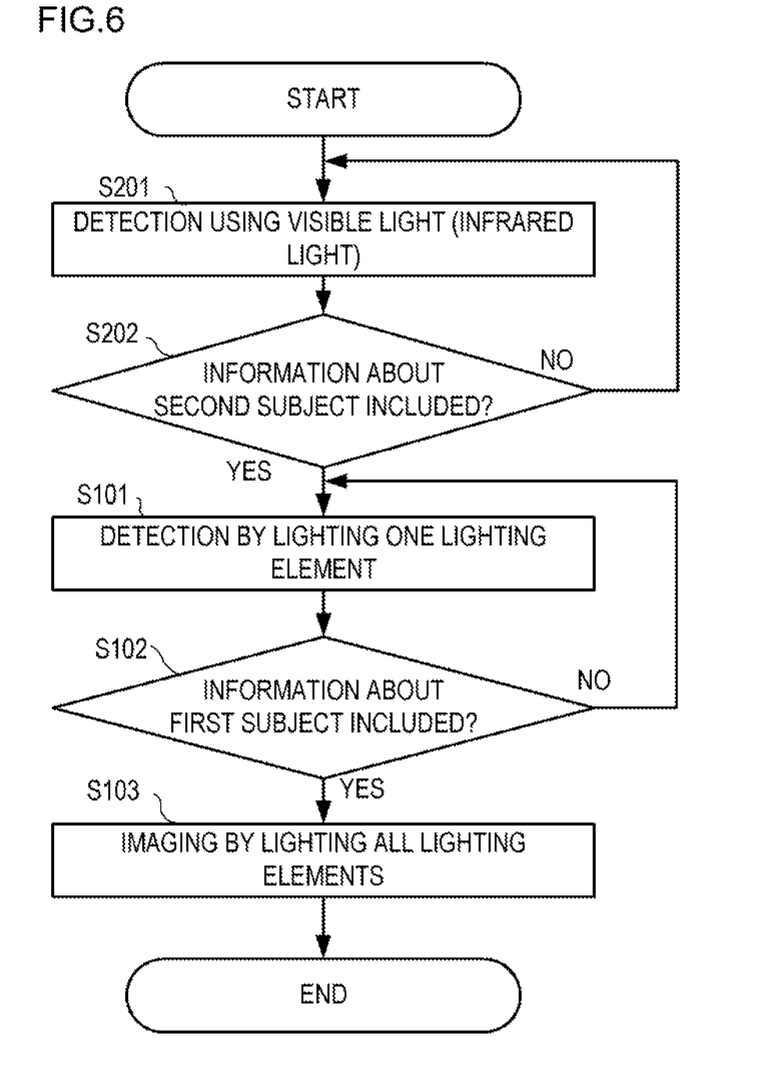
FIG. 6 is a flowchart of an operation of the imaging system according to the second embodiment.
Figure 7:
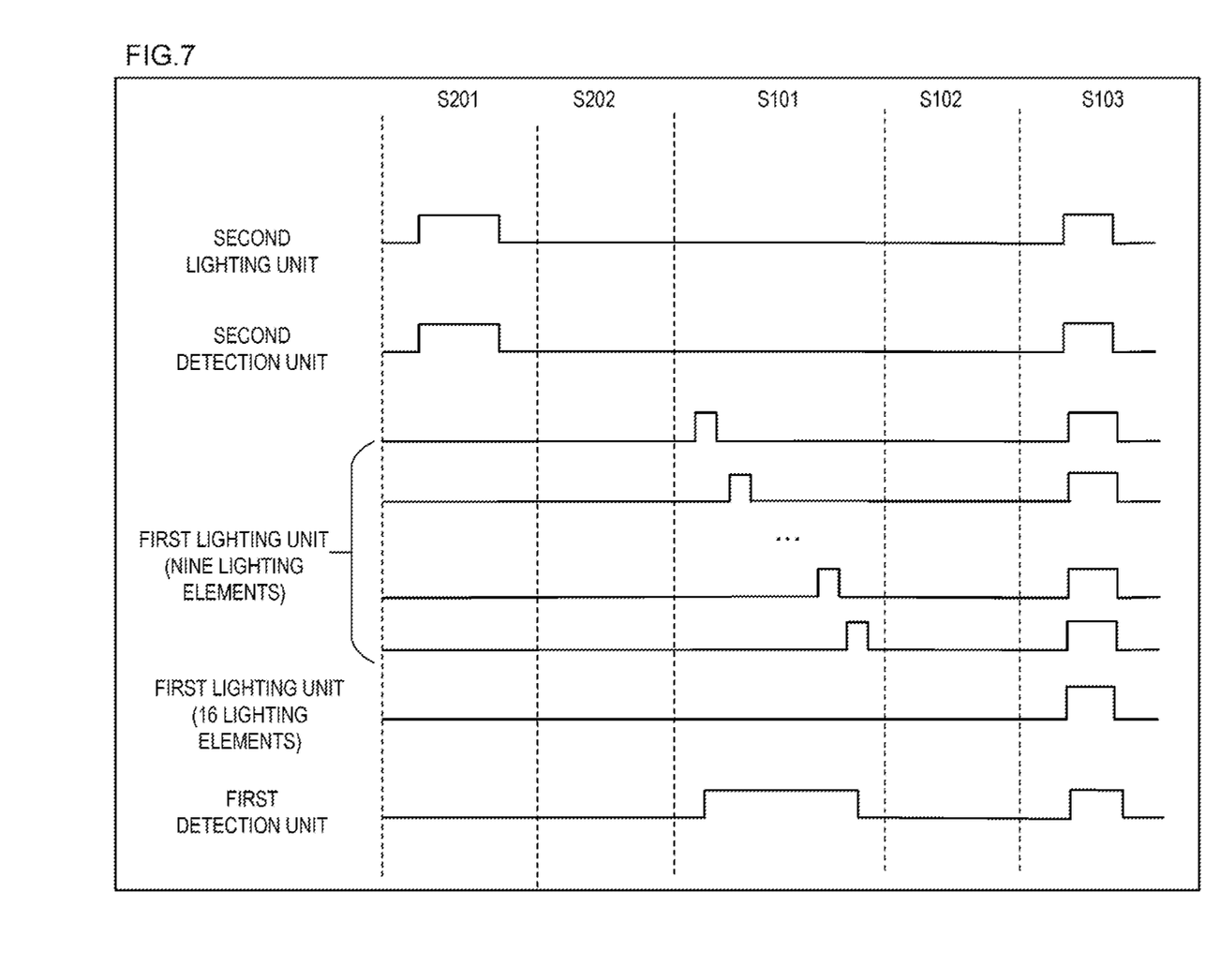
FIG. 7 is a time chart of the operation of the imaging system according to the second embodiment.

(Operation of Imaging System): Using FIGS. 6 and 7, an operation of the imaging system 1001 according to this embodiment will be described. FIG. 6 is a flowchart showing the processing performed by the imaging system 1001. Note that S101 to S103 on the flowchart are similar to S101 to S103 on the flowchart of the first embodiment, shown in FIG. 2, and therefore detailed description thereof has been omitted. FIG. 7 is a time chart showing the occurrence of operations by the respective configurations of the imaging system 1001. Note that FIG. 7 shows an example in which the lit lighting elements are switched in accordance with the passage of time in S102 so that nine lighting elements are lit one by one.

(Step S201): In S201, the control unit 170 emits visible light or infrared light onto the subject by controlling the second lighting unit 210 using a control signal. The control unit 170 then detects visible light or infrared light reflected by the subject by controlling the second detection unit 200 using a control signal, and converts the detected light into a signal (an image signal).

Here, as shown on the time chart in FIG. 7, in S201, the first lighting unit 110 is extinguished (unlit). Further, the first detection unit 100 is inoperative.

Note that sunlight may be used as the visible light, and infrared light emitted by a person may be used as the infrared light. In other words, since large amounts of visible light and infrared light are generated in the natural world, the imaging system 1001 does not have to include the second lighting unit 210.

(Step S202): In S202, the control unit 170 controls the second detection unit 200 to determine whether or not the second detection unit 200 has detected the second subject 141. More specifically, the control unit 170 determines whether or not the signal converted by the second detection unit 200 includes information about the second subject 141 (the person). When information about the second subject 141 is included, the processing advances to S101, and when the information is not included, the processing returns to S201. Hence, when information about the second subject 141 is included in the signal, the first lighting unit 110 is lit in S101, and when the information is not included, the first lighting unit 110 is maintained in an extinguished state.

Note that in this embodiment, as shown on the time chart in FIG. 7, the second lighting unit 210 is lit and the second detection unit 200 is operative in S103. However, the second lighting unit 210 may be extinguished and the second detection unit 200 may be inoperative in S103.

Hence, when the second detection unit 200 does not detect the second subject 141 using visible light or infrared light, terahertz wave emission by the first lighting unit 110 is not performed. Thus, the time during which the first lighting unit 110 (the lighting elements 120) is lit can be shortened, and as a result, the power consumption of the lighting elements 120 can be further reduced. Moreover, similarly to the first embodiment, after the first lighting unit 110 is lit, terahertz waves are emitted by a small number of lighting elements 120 until the first subject 140 is detected. Accordingly, a reduction in the overall power consumption of the imaging system can be achieved.

Note that in this embodiment, imaging (the processing of S101) by terahertz wave emission is started when a person is detected by the human sensor, but the present invention is not limited thereto. For example, when a person is detected by the human sensor, the distance between the person and the imaging system 1001 may be measured using a distance sensor, and when the distance is not more than a predetermined threshold, the control unit 170 may begin imaging by terahertz wave emission. In so doing, a situation in which the concealed object cannot be detected by terahertz wave emission and detection due to the person being far away can be suppressed.

Alternatively, imaging (the processing of S101; the processing of the first operation mode) by terahertz wave emission may be started when a sound-detecting sensor detects sound of at least a predetermined magnitude. Thus, sound can be used to determine whether or not the person is close to the imaging system 1001, and as a result, the presence of a person can be determined by consuming even less power than in the second embodiment, in which light emission and detection are required. In other words, any method with which it is possible to determine whether or not the person is close to the imaging system 1001 using a smaller quantity of power than the quantity used by terahertz wave emission may be used for the processing of S201 and S202. Furthermore, a combination of several methods may be used for the processing of S201 and S202.

According to the above description, a reduction in power consumption can be achieved when a subject is photographed by emitting terahertz waves.

<Other Embodiments>: Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to road out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-087431, filed on May 19, 2020, which is hereby incorporated by reference herein in its entirety.

What is claimed is:

1. A system comprising:
a first lighting device that emits terahertz waves at a first quantity of light emission in a first operation mode, and emits terahertz waves at a second quantity of light emission, which is larger than the first quantity of light emission, in a second operation mode;
a first detection device that detects reflected terahertz waves by a target;
a control device that switches from the first operation mode to the second operation mode in a case where the first detection device detects the target in the first operation mode; and
a second detection device that detects visible light or infrared light,
wherein the control device executes control so as to (1) keep the first lighting device extinguished before the second detection device detects another target, and (2) in a case where the second detection device has detected the another target, switch to the first operation mode, thereby the first lighting device emitting terahertz waves at the first quantity of light emission, and
wherein the another target is a person, and the target is a concealed object carried by the person.

2. The system according to claim 1, further comprising a second lighting device that emits visible light or infrared light.

3. The system according to claim 1, further comprising a sensor that detects sound,
wherein the control device executes control so as to (1) keep the first lighting device extinguished before the sensor detects sound of at least a predetermined magnitude, and (2) in a case where after the sensor has detected the sound of at least the predetermined magnitude, switch to the first operation mode, thereby the first lighting device emitting terahertz waves at the first quantity of light emission.

4. The system according to claim 1, wherein the first detection device acquires image information about the target based on reflected waves from the terahertz waves emitted by the first lighting device in the second operation mode.

5. A system comprising:
   a first lighting device that emits terahertz waves and includes a plurality of lighting elements;
   a first detection device that detects reflected terahertz waves by a target; and
   a control device configured to switch from a first operation mode and a second operation mode in a case where the first detection device detects the target in the first operation mode,
   wherein in the first operation mode, a first number of lighting elements, among the plurality of lighting elements, are lit, and
   in the second operation mode, a second number of lighting elements, the second number of which is larger than the first number, among the plurality of lighting elements, are lit.

6. The system according to claim 5, wherein, in the first operation mode, the first number of lighting elements are lit and extinguished repeatedly within a single frame period.

7. The system according to claim 5, wherein, in the first operation mode, the lit lighting elements are switched over in accordance with passage of time so that the lighting elements are lit the first number at a time.

8. The system according to claim 5, wherein the plurality of lighting elements include lighting elements having a first directivity and lighting elements having a second directivity, which is a higher directivity than the first directivity,
   in the first operation mode, the lighting elements having the first directivity are lit, and
   in the second operation mode, the lighting elements having the second directivity are lit.

9. The system according to claim 5, wherein the plurality of lighting elements include lighting elements having a first power consumption and lighting elements having a second power consumption, which is a larger power consumption than the first power consumption,
   in the first operation mode, the lighting elements having the first power consumption are lit, and
   in the second operation mode, the lighting elements having the second power consumption are lit.

10. The system according to claim 1, wherein the control device executes control so that in a case where a switch to the second operation mode is performed, specularly reflected terahertz waves by the target, enter the first detection device.

11. The system according to claim 1, wherein the terahertz waves are electromagnetic waves having a component in a frequency band included within a range from at least 0.2 THz to not more than 30 THz.

12. The system according to claim 11, wherein the terahertz waves are electromagnetic waves having a component in a frequency band included within a range from at least 0.2 THz to not more than 1 THz.

13. The system according to claim 5,
    wherein the first detection device detects the target by determining whether or not information about the target is included in information based on the reflected terahertz waves by using a trained model that has undergone machine learning for detecting the target.

14. The system according to claim 5,
    wherein in a case where the first detection device has detected the target in the second operation mode, the control device maintains the second operation mode, and
    in a case where the first detection device has not detected the target in the second operation mode, the control device switches from the second operation mode to the first operation mode.

15. The system according to claim 5, further comprising a second detection device that detects visible light or infrared light,
    wherein the control device executes control so as to (1) keep the first lighting device extinguished before the second detection device detects another target, and (2) in a case where the second detection device has detected the another target, switch to the first operation mode.

16. The system according to claim 15, further comprising a second lighting device that emits visible light or infrared light.

17. The system according to claim 5, further comprising a sensor that detects sound,
    wherein the control device executes control so as to (1) keep the first lighting device extinguished before the sensor detects sound of at least a predetermined magnitude, and (2) in a case where after the sensor has detected the sound of at least the predetermined magnitude, switch to the first operation mode.

18. The system according to claim 5, wherein the first detection device acquires image information about the target based on reflected waves from the terahertz waves emitted by the first lighting device in the second operation mode.

19. The system according to claim 5, wherein the terahertz waves are electromagnetic waves having a component in a frequency band included within a range from at least 0.2 THz to not more than 30 THz.

20. The system according to claim 19, wherein the terahertz waves are electromagnetic waves having a component in a frequency band included within a range from at least 0.2 THz to not more than 1 THz.

* * * * *